United States Patent
Raman et al.

(10) Patent No.: US 10,626,562 B2
(45) Date of Patent: *Apr. 21, 2020

(54) CONCRETE PATCHING ROBOT

(71) Applicant: RevolutioNice Inc., Belleville, NJ (US)

(72) Inventors: Sreenivas Raman, Park Ridge, NJ (US); Elie Cherbaka, Franklin Lakes, NJ (US); Ryan J. Giovacchini, Hamilton, NJ (US); Brian Jennings, Paramus, NJ (US); Thomas C. Slater, New York, NY (US)

(73) Assignee: RevolutioNice Inc., Belleville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,183

(22) Filed: Apr. 8, 2019

(65) Prior Publication Data

US 2019/0234029 A1   Aug. 1, 2019

Related U.S. Application Data

(63) Continuation of application No. 15/185,451, filed on Jun. 17, 2016, now Pat. No. 10,253,462.

(60) Provisional application No. 62/180,604, filed on Jun. 17, 2015.

(51) Int. Cl.
| | | |
|---|---|---|
| *E01C 23/00* | (2006.01) |
| *E01D 22/00* | (2006.01) |
| *B25J 11/00* | (2006.01) |
| *B66F 7/06* | (2006.01) |
| *B25J 5/00* | (2006.01) |
| *B66F 7/00* | (2006.01) |

(52) U.S. Cl.
CPC ............... *E01C 23/00* (2013.01); *B25J 5/007* (2013.01); *B25J 11/00* (2013.01); *B66F 7/00* (2013.01); *B66F 7/0666* (2013.01); *E01D 22/00* (2013.01)

(58) Field of Classification Search
CPC .......... E01C 23/00; E01C 23/06; E01C 23/07; E01C 19/46; E01C 19/00; E01D 22/00; B25J 11/00
See application file for complete search history.

(56) References Cited

U.S. PATENT DOCUMENTS 3,409,334 A * 11/1968 Schwing ................. E04G 21/04
                                                              406/166
3,967,913 A *  7/1976 Gabriel, Jr. ......... E01C 19/4853
                                                              404/109

(Continued)

OTHER PUBLICATIONS

Notice of Allowance, dated Nov. 29, 2018, from corresponding U.S. Appl. No. 15/185,451.

(Continued)

*Primary Examiner* — Abigail A Risic
(74) *Attorney, Agent, or Firm* — Brient IP Law, LLC

(57) ABSTRACT

A concrete patching robot has a multi-axis robotic manipulator mounted on a powered, movable, platform that can be raised and lowered to access the underside of structures that may be substantial distances above the ground, for example, the underside of an elevated highway. The entire assembly is maneuverable under the work area and the platform may be raised to access the concrete. Once the work area is in reach of the arm, the device is able to use numerous tools to complete essential steps to repair the concrete.

20 Claims, 4 Drawing Sheets

(56) References Cited

U.S. PATENT DOCUMENTS

| | | | | | |
|---|---|---|---|---|---|
| 4,322,178 | A | * | 3/1982 | Lee | E01C 19/266 37/903 |
| 4,511,284 | A | * | 4/1985 | Sterner | E01C 19/1022 239/654 |
| 4,640,644 | A | * | 2/1987 | Puchala | E01C 23/128 299/17 |
| 4,655,676 | A | * | 4/1987 | Jannborg | B25J 9/0018 29/792 |
| 5,333,969 | A | * | 8/1994 | Blaha | E01C 19/46 404/102 |
| 5,391,017 | A | * | 2/1995 | Thomas | E01C 23/088 299/39.6 |
| 5,565,032 | A | * | 10/1996 | Wyner | E01D 22/00 118/315 |
| 6,176,551 | B1 | * | 1/2001 | Page | E01C 23/088 172/684.5 |
| 6,821,052 | B2 | * | 11/2004 | Zurn | E01C 19/006 404/101 |
| 7,201,536 | B1 | * | 4/2007 | Westbrook | E01C 19/185 404/108 |
| 7,729,836 | B2 | * | 6/2010 | Gilchrist | E01C 23/06 701/50 |
| 8,167,513 | B2 | * | 5/2012 | Ryan | E01C 23/06 404/101 |
| 8,517,629 | B2 | * | 8/2013 | Gregerson | E01C 23/06 404/110 |
| 8,562,248 | B2 | * | 10/2013 | Kleiger | E01C 23/065 404/101 |
| 2002/0015618 | A1 | * | 2/2002 | Quenzi | E04G 21/0436 404/75 |
| 2003/0069668 | A1 | * | 4/2003 | Zurn | E01C 19/006 700/245 |
| 2008/0031688 | A1 | * | 2/2008 | Gilchrist | E01C 23/06 404/108 |
| 2009/0252575 | A1 | * | 10/2009 | Fuegel | B66C 23/32 414/10 |
| 2009/0274515 | A1 | * | 11/2009 | Cooper | E01C 23/06 404/72 |
| 2010/0322710 | A1 | * | 12/2010 | Ryan | E01C 23/06 404/78 |
| 2012/0053726 | A1 | * | 3/2012 | Peters | E04G 21/22 700/252 |
| 2012/0253612 | A1 | * | 10/2012 | Byrne | E01C 23/06 701/50 |
| 2016/0001461 | A1 | * | 1/2016 | Gardiner | B25J 11/00 264/219 |
| 2016/0318248 | A1 | * | 11/2016 | Susnjara | B29C 64/106 |
| 2017/0016244 | A1 | * | 1/2017 | Keller | E04G 21/0436 |

OTHER PUBLICATIONS

Office Action, dated Feb. 28, 2017, from corresponding U.S. Appl. No. 15/185,451.

* cited by examiner

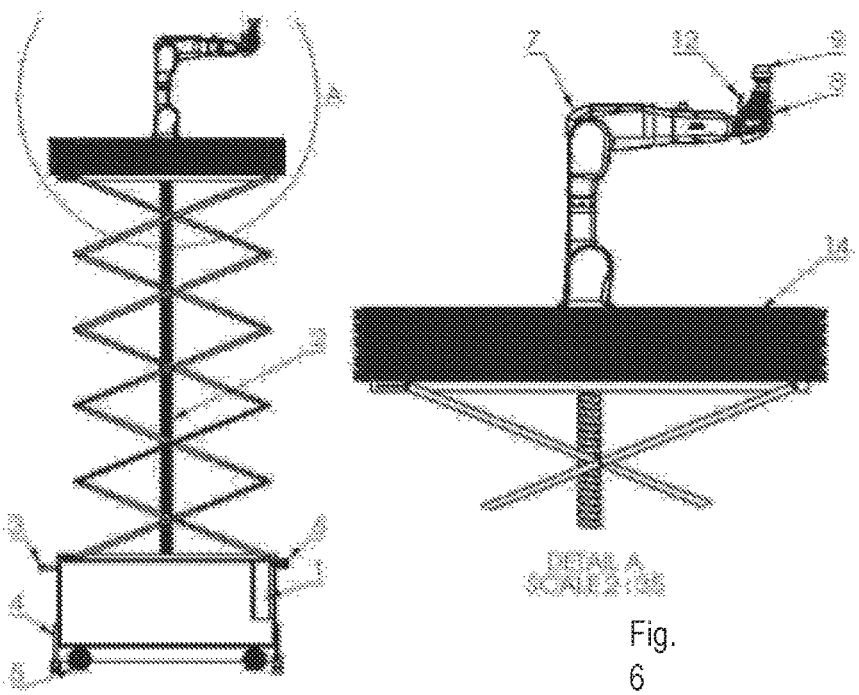
Fig. 5
Fig. 6
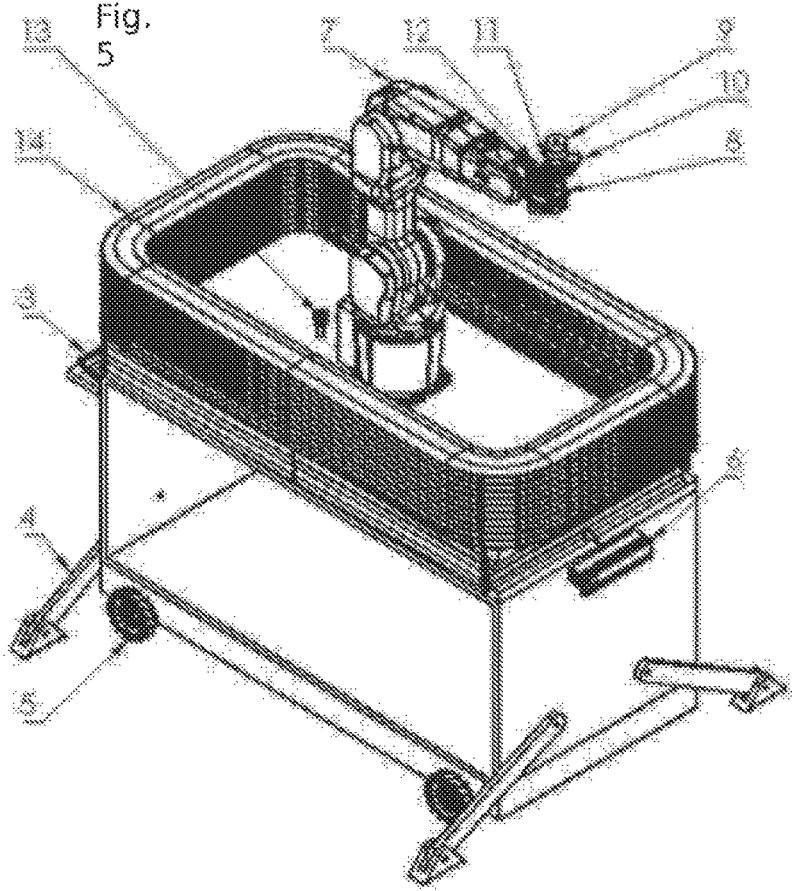
Fig. 7

CONCRETE PATCHING ROBOT

CROSS-REFERENCES TO RELATED APPLICATIONS

This application claims the benefit of U.S. Provisional Application For Patent, Ser. No. 62/180,604, filed Jun. 17, 2015 and whose contents are incorporated by reference herein in their entirety.

FIELD OF THE INVENTION

Embodiments of the present invention include concrete patching systems, and more specifically, robots for concrete patching.

BACKGROUND OF THE INVENTION

Concrete surfaces deteriorate over time and are maintained by patching worn areas. Concrete that is compromised is removed with a chipping gun, internal structures, such as rebar, are repaired if present, and then the area is filled new grout. To provide a structure to which the new grout can hold, pins are often inserted into the remaining concrete and new grout is applied in layers or pumped into a form to fill the cavity. This patch repair is frequently needed on the underside of the road decks of elevated highways and bridges and requires a worker to operate heavy tools above his head while at a height. The proposed invention uses a remotely operated and/or, in some cases autonomously functioning, lift, robotic arm, and necessary tools to perform concrete patch repairs after the damaged concrete has been removed.

BRIEF SUMMARY OF THE INVENTION

An object of the present invention is a robot for concrete patching and repairs.

Another object of the present invention is a robot which can patch and repair concrete under remote control.

Yet another object of the present invention is a robot which can patch and repair concrete in a dynamic environment.

Still another object of the present invention is a concrete patching robot which is mobile.

An embodiment of the present invention is a concrete patching robot comprising a multi-axis robotic manipulator mounted on a powered, movable, platform that can be raised and lowered to access the underside of structures that may be substantial distances above the ground, for example, the underside of an elevated highway. The entire assembly is maneuverable under the work area and the platform may be raised to access the concrete. Once the work area is in reach of the arm, the device is able to use numerous tools to complete essential steps to repair the concrete.

BRIEF DESCRIPTION OF THE SEVERAL VIEWS OF THE DRAWING

FIGS. 1-8 show various views of various embodiments of the invention.

DESCRIPTION OF THE INVENTION

Premise of Operation

Figure 1:
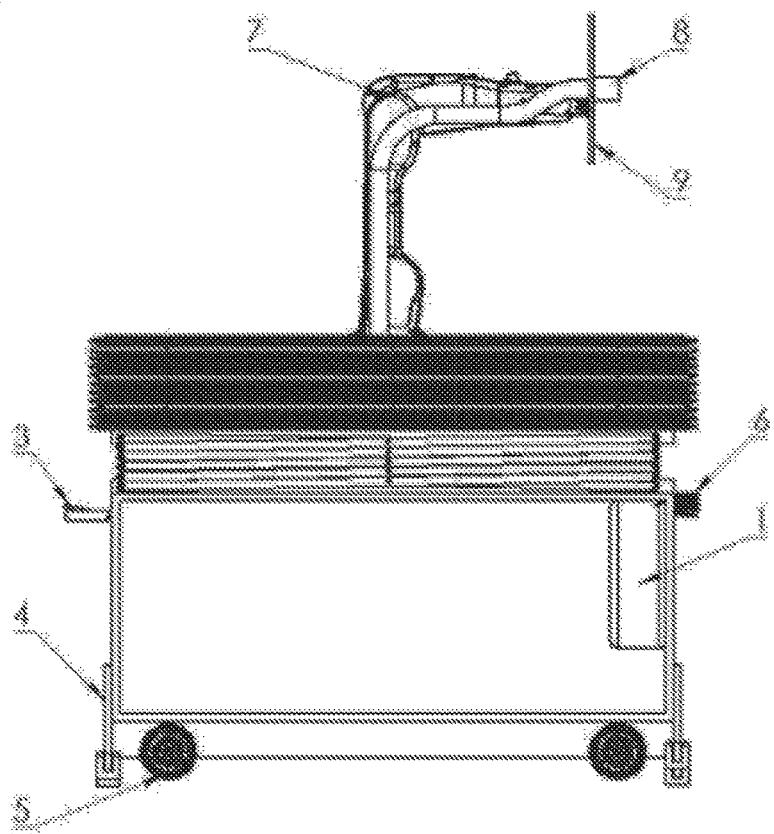
Figure 2:
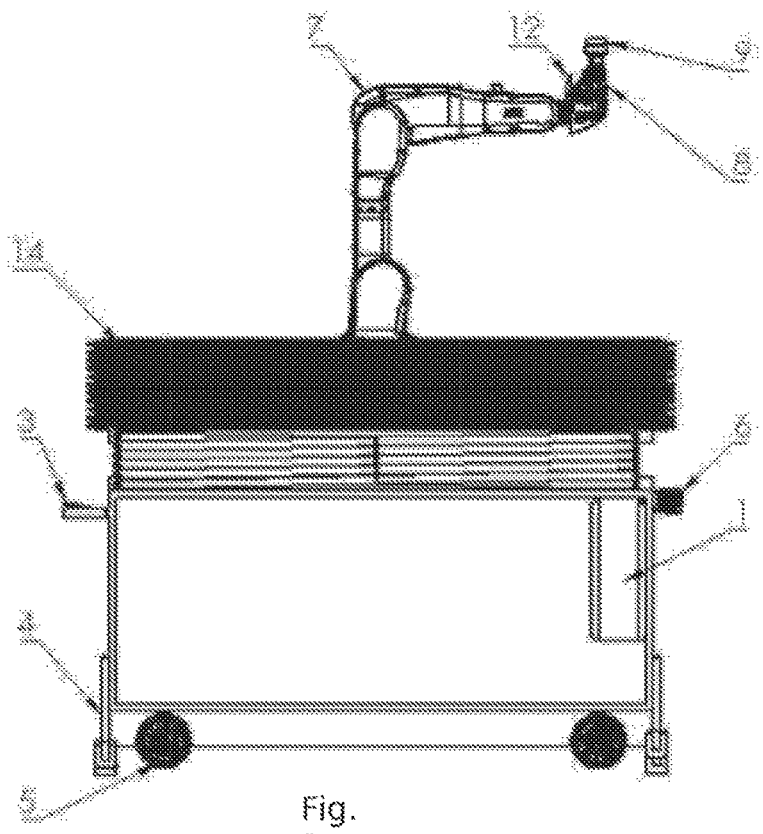
Figure 3:
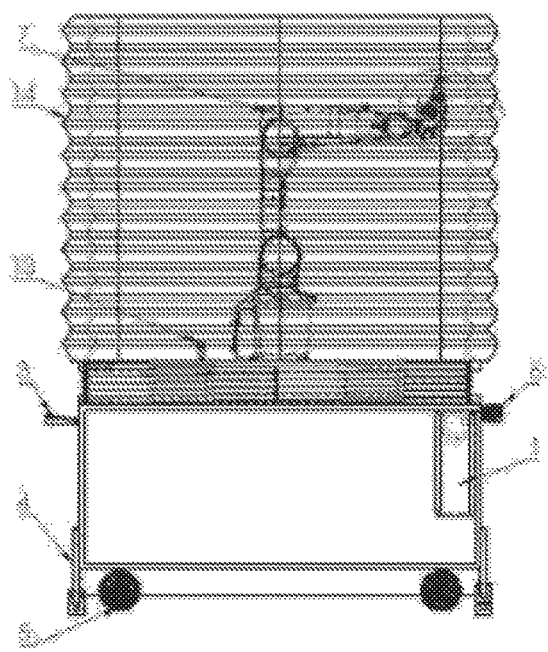
Figure 4:
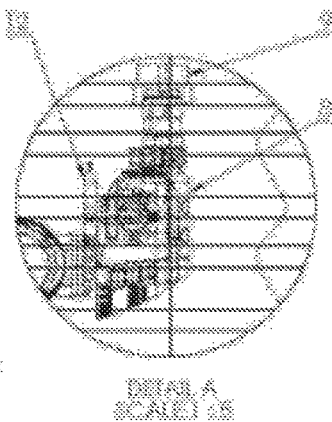
Figure 8:
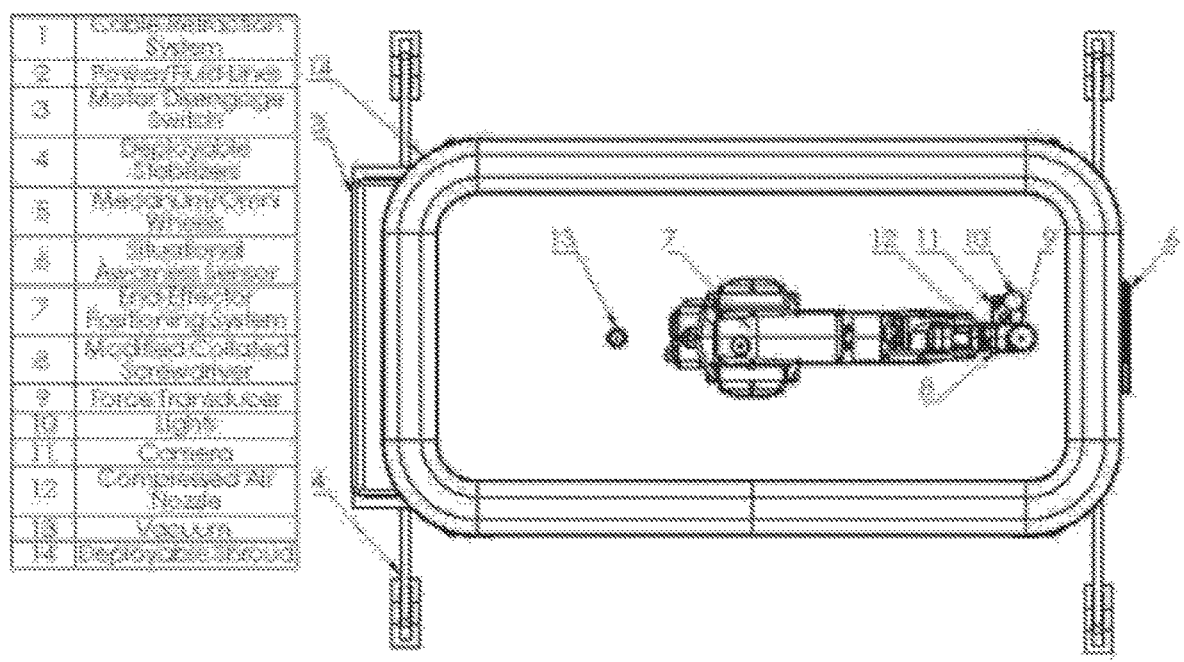

This invention comprises a multi-axis robotic manipulator mounted on a powered, movable, platform that can be raised and lowered to access the underside of structures that may be many tens of feet above the ground, for example, the underside of an elevated highway. The entire assembly is maneuvered under the work area and the platform is then is raised to access the concrete. Once the work area is in reach of the arm, the device is able to use numerous tools to complete essential steps to repair the concrete.

All arm motions and tool actions are coordinated and directed by control software that function autonomously or allow for the device to be remotely operated by a worker on the ground or some distance away. Their connection to the control device is, in different embodiments, wired or wireless. Real time video feeds of the various parts of the robot and work area allow control software or an operator to monitor the work and manually direct it if needed. In addition, the operator and control software have access to data from sensors (e.g. force or distance sensors) located on or in the arm to aid them in determining that a task has been completed satisfactorily.

As this process creates considerable amounts of dust and debris, the platform is equipped with raisable shroud that encloses most of the work area when needed. This approach provides a barrier for the movement of any airborne materials. In various embodiments of the invention, a dust collection system is present in the form of a vacuum that exhausts air from inside the curtain through a filter or a water spraying solution may be employed. Additionally, the shroud is able to contain and properly vent gases that result from any activities such as welding.

Tools

DRILL. In order to attach the pins to the remaining concrete, regularly spaced holes need to be drilled in the cavity. The robot arm maneuvers a drill tool to the appropriate position and orientation. The tool operates upon receiving a signal from either a control program or an operator and is pushed into the concrete by the arm until a hole of the required depth has been created. The arm is able to accommodate a standard drill, as well as a hammer drill, which is frequently required when drilling into concrete. Devices are well known in the relevant art that are specially designed to place anchors in concrete; this invention is able to accommodate such devices and use them as they are intended to be used by equipment operators.

ANCHOR/PIN PLACER. A tool to insert the pins or anchors into the holes, along with any other needed material, such as a glue, is present as part of the invention. This tool has a mechanism to be fed with new pins or anchors or be able to pick up pins or anchors from a holder. The tool is able to position pins or anchors above previously drilled holes and apply enough force to insert them to the required depth. A force sensor prevents excessive force from bending or damaging the pin or anchor. If an adhesive is needed, the tool applies it in the hole and/or to the end of the pin or anchor. In various embodiments of this tool, a robotic gripper, specialized injector, or third party pin or anchor tool may be used to pick and place the pins or anchors.

BLOWER. A compressed air nozzle is available to the robotic arm for the purpose of blowing away any remaining concrete dust after the chipping and pinning process. The arm, at the direction of a control program or a human operator, moves the compressed air nozzle along a path so that the entirety of the cavity surface is exposed to high velocity air and as much loose debris as possible is removed. The compressed air is supplied from a pump located on the ground or on the lift platform and may or may not be an integral part of the invention.

COLLAR PLACEMENT AND GROUT FILL. To fill a downward facing patch cavity, the robot uses a tool to place a flat board or form under the cavity and level with the unmodified surrounding concrete. In one embodiment of the invention, the robot applies an adhesive to the undamaged concrete around the cavity and place a board so that it adheres appropriately and creates a cavity "floor" to hold the grout in while it cures.

FILL NOZZLE. The robot also has a tool to apply grout to the patch area. In various embodiments, the robot places the open end of a tube connected to a grout pump into the cavity that exists above the form. The operator or control software directs the pump to supply grout for the amount of time necessary to fill the cavity. The nozzle or the form has a mechanism to prevent uncured grout from flowing out of the hole that was created to provide access for the nozzle.

In another embodiment, the robot uses a grout spraying tool to spray grout onto the patch area. Similar tools are well known in the relevant art; they may be modified for use on the end of the robot arm in ways well known in the relevant art. A shotcrete system may be used.

Arm

A multi-axis robot arm is used to position all tools and manipulators. These arms are currently produced by numerous companies and known in the prior art, and there exist many different models with different abilities. All such arms are able to move in a very controlled manner and are able to position themselves with a high degree of repeatability. The invention makes use of an existing arm or a custom designed one that satisfies requirements for lifting capacity, reach, applicable force, and robustness.

Platform Lift

The arm and tools are located on a lifting mechanism to allow for the arm to be positioned under and then raised to the vicinity of the work area. The lift may be a prior art model customized to meet any requirements, or may be a custom built machine. To allow access to the underside of bridge and roadway decks, the lift has the ability to raise the platform at least approximately forty (40) feet. The base of the lift is motorized and able to move under its own power. The operation of the lift and the movement of the base is controlled by either a control program or a human operator.

In use, the invention is employed as described above.

Although this invention has been described with a certain degree of particularity, it is to be understood that the present disclosure has been made only by way of illustration and that numerous changes in the details of construction and arrangement of parts may be resorted to without departing from the spirit and scope of the invention.

What is claimed is:

1. A concrete patching robot for patching a cavity in concrete, the concrete patching robot comprising:
a base portion comprising at least one motorized wheel disposed adjacent a lower end of the base portion;
a vertically adjustable platform disposed adjacent an upper portion of the base portion;
a lifting mechanism coupled to the vertically adjustable platform;
a multi-axis robot arm disposed on the platform;
a drill tool configured to drill one or more holes in the cavity;
a grout fill tool configured to fill the cavity with grout; and
a computer controller configured to:
cause the lifting mechanism to lift the vertically adjustable platform such that the robot arm is positioned adjacent the cavity;
cause the drill tool to drill the one or more holes in the cavity;
cause the grout fill tool to fill the cavity with grout.

2. The concrete patching robot of claim 1, further comprising an anchor placer tool configured to insert an anchor in each of the one or more holes.

3. The concrete patching robot of claim 2, wherein the computer controller is further configured to cause the anchor placer tool to insert an anchor in each of the one or more holes.

4. The concrete patching robot of claim 3, further comprising:
a force sensor configured to prevent excessive force by the anchor placer tool when placing the anchor in each of the one or more holes.

5. The concrete patching robot of claim 1, further comprising:
a raisable shroud disposed about a perimeter of the vertically adjustable platform, the raisable shroud comprising a curtain that is configured to raise between:
a lowered position adjacent the platform; and
a raised position that encompasses a work area of the multi-axis robot arm when in the raised position.

6. The concrete patching robot of claim 5, wherein the computer controller is further configured to cause the raisable shroud to raise to the raised position.

7. The concrete patching robot of claim 6, further comprising a dust collection system comprising a vacuum configured to exhaust air from inside the raisable shroud when the raisable shroud is in the raised position.

8. The concrete patching robot of claim 1, wherein:
the drill tool is disposed on an end of the multi-axis robot arm; and
the computer controller configured to cause the multi-axis robot arm to push the drill tool into a piece of concrete adjacent the cavity until a hole of a required depth is created.

9. The patching robot of claim 1, wherein:
the concrete patching robot comprises a force sensor disposed on the multi-axis robot arm;
the drill tool is disposed on the end of the multi-axis robot arm; and
the computer controller is configured to receive data from the force sensor.

10. The patching robot of claim 1, wherein the computer controller is configured to use the data from the force sensor to determine that a drilling task has been completed satisfactorily.

11. A patching robot comprising:
a base portion comprising at least one motorized wheel disposed adjacent a lower end of the base portion;
a vertically adjustable platform disposed adjacent an upper portion of the base portion;
a multi-axis robot arm disposed on the vertically adjustable platform;
a raisable shroud disposed about a perimeter of the vertically adjustable platform, the raisable shroud comprising a curtain that is configured to raise between:
a lowered position adjacent the platform; and
a raised position that encompasses a work area of the multi-axis robot arm when in the raised position;
an arm controller operationally connected to the arm; and
a drill tool disposed on an end of the robot arm, wherein the arm controller is configured to cause the robot arm to push the drill tool into a piece of concrete until a hole of a required depth is created.

12. The patching robot of claim 11, wherein:
the patching robot comprises a force sensor disposed on the multi-axis robot arm; and
the arm controller is configured to receive data from the force sensor.

13. The patching robot of claim 12, wherein the arm controller is configured to use the data from the force sensor to determine that a drilling task has been completed satisfactorily.

14. The patching robot of claim 11, further comprising:
a tool configured to place a pin into the hole created by the drill tool;
a grout pump; and
a fill nozzle connected to the grout pump, wherein the grout pump is configured to pump grout into a cavity.

15. The patching robot of claim 14, wherein:
the cavity is a downward facing cavity; and
the patching robot is configured to place a flat form under the cavity such that the form is level with unmodified concrete that surrounds the cavity, wherein the flat form defines a floor of the cavity.

16. The patching robot of claim 15, further comprising:
a lifting mechanism configured to lift the vertically adjustable platform such that the robot arm is positioned adjacent the cavity.

17. The patching robot of claim 16, further comprising a dust collection system comprising a vacuum configured to exhaust air from inside the curtain.

18. The patching robot of claim 11, wherein the drill tool comprises a hammer drill.

19. The patching robot of claim 11, wherein the patching robot further comprises a blower configured to blow air adjacent the cavity to blow away concrete dust resulting from the drill tool creating the hole.

20. The patching robot of claim 11, further comprising at least one deployable stabilizer disposed adjacent the lower end of the base portion.

* * * * *